(No Model.)
W. H. JOHNSON.
CLUTCH.
No. 408,881. Patented Aug. 13, 1889.
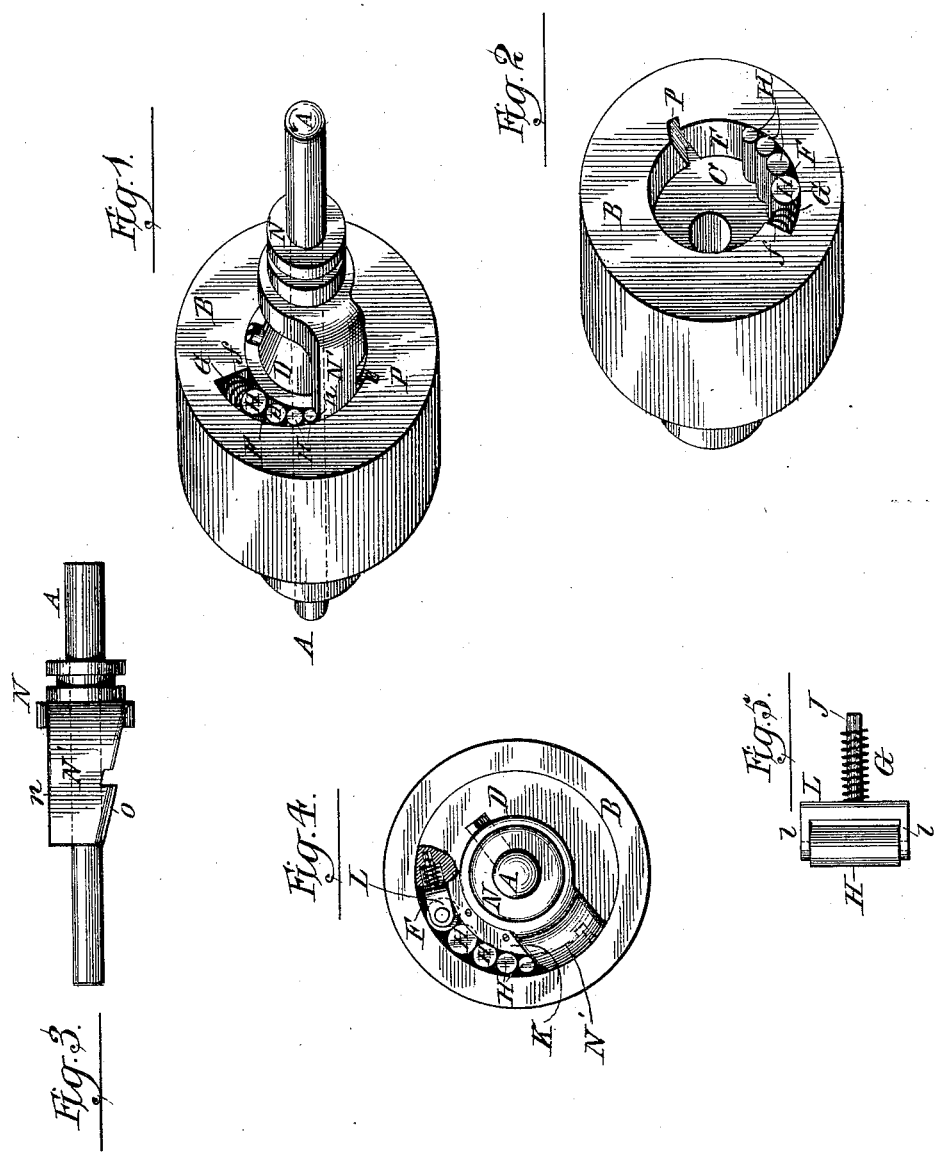
Witnesses:-
Louis M. F. Whitehead.
Wm. F. Henning.
Inventor:
Willis H. Johnson
by Dayton & Poole
Attorneys.

UNITED STATES PATENT OFFICE.

WILLIS H. JOHNSON, OF SPRINGFIELD, ILLINOIS, ASSIGNOR, BY DIRECT AND MESNE ASSIGNMENTS, OF ONE-HALF TO HARRY L. IDE, OF SAME PLACE.

CLUTCH.

SPECIFICATION forming part of Letters Patent No. 408,881, dated August 13, 1889.

Application filed January 26, 1887. Renewed September 20, 1887. Serial No. 250,258. (No model.)

*To all whom it may concern:*

Be it known that I, WILLIS H. JOHNSON, of Springfield, in the county of Sangamon and State of Illinois, have invented certain new and useful Improvements in Friction-Clutches; and I do hereby declare the following to be a full, clear, and exact description of the invention, such as will enable others skilled in the art to which it pertains to make and use it, reference being had to the accompanying drawings, which form part of this specification.

My invention is herein embodied in a shaft, a collar fixed upon the shaft, a shell provided with a recess containing the collar, one or more rollers or their equivalents placed in a tapering recess formed in either the shell or the collar and partially inclosed by the opposing member of the clutch, a spring arranged to force the roller or rollers toward the smaller end of the tapering recess, and a shifter which has an endwise movement on the shaft arranged to force the rollers toward the wider end of said tapering recess in opposition to the spring.

Figure 1 is a perspective view of a clutch embodying my invention. Fig. 2 is a detached view of the shell containing the recess, a series of friction-rollers in said recess, and the spring. Fig. 3 is a detached view of the shifter and a fragment of the shaft which carries the clutch. Fig. 4 is an end view of the clutch, showing the tapering recess formed in the collar instead of in the shell. Fig. 5 shows a detail.

A represents a shaft, B the shell or hollow member of the clutch loosely mounted on the shaft and provided with a recess C, and D a collar secured to the shaft and fitted to rotate freely but closely in the recess C of the shell. In the shell B or in the collar D is formed a tapering recess F of any suitable length, and in this recess is placed a roller or a series of rollers H, which, if in a series, vary in diameter to correspond with the taper of the recess, and are arranged therein as shown—to wit, the larger in the deeper portion of the recess and the smaller in the shallower portion thereof. Between the roller or the larger roller of the series and the abutment $f$ at the larger end of the recess F is placed an expanding spring G, which tends to force the roller or rollers toward the smaller end of the recess. Driving-power may be applied either to the shaft A and its collar D or to the shell B of the clutch; if to the collar D in the arrangement of the recess F shown in Figs. 1 and 2, said collar is assumed to be driven from the right to the left, as indicated by the arrow applied to the end of the shaft in Fig. 1. If power be assumed to be applied to the shell B, (which may be a pulley or other wheel adapted to receive power from a motor,) the rotation of said shell will be from the left to the right as viewed in the drawings.

In the arrangement of the recess F shown in Fig. 4 power applied to the shaft A is assumed to rotate said shaft and its collar D from the left to the right, or, if to the shell B, said shell will be assumed to travel from the right to the left. As the spring G forces the rollers toward the smaller end of the recess F until said rollers bear forcibly upon both the collar and the shell, said rollers will be clamped or wedged firmly between the collar and shell, with the result of giving the motion of the driving member of the clutch to the other or driven member.

For the purpose of disengaging the members of the clutch a shifter N is provided, which slides freely on the shaft A toward and from the clutch, as indicated in Fig. 3, and which has a wedge-shaped projection N′ parallel with the shaft. This projection is adapted to enter the small end of the recess F beyond the rollers H, and in so doing it will force the rollers backward toward the larger part of said recess, where they cease to clamp or bind between the members of the clutch, and therefore allow the driven part to come to rest. The edge $n$ of the shifter projection N′, which bears against the rollers, is straight and parallel with the axis of the shaft; but the opposite edge is inclined, as shown clearly in Fig. 3, and bears against a correspondingly-inclined shoulder at the narrower end of the recess F. As here shown, this inclined shoulder is formed in part by an oblique groove P in the member containing the recess F, and fitting this groove is a lateral rib or feather O on the shifter projection N'. In thrusting the shifter projection N' inward, therefore, the inclined feather O, working in the correspondingly-inclined groove P, will cause the straight edge of said shifter projection to press against the rollers H and to force them toward the larger end of the groove. Conversely, when the shifter is retracted, its straight edge is drawn toward the narrower end of the recess F and the rollers advance toward the narrower end of the recess by the action of the spring G. Thus, to throw the clutch out of engagement the shifter N is thrust inwardly, and to allow the clutch to engage the shifter is retracted.

The shifter of course shares the motion of the part containing the recess in which the shifter works. The engagement of the feather O on the shifter projection N' with the groove P in the recessed member of the clutch not only insures the movement of the straight side of the shifter toward and from the narrow end of the recess when the shifter is retracted and advanced, but such engagement of the groove and feather also preserves the proper relation of the shifter with the part of the clutch with which it is engaged in opposition to any tendency of friction of the shifter with the shaft or with the opposing member of the clutch tending to disturb such relation, and to thereby impair the reliability of the clutch.

The spring G may be of any suitable form and applied in any suitable way. As shown in Figs. 1 and 2, it is merely an expanding coil bearing directly upon the adjacent roller and against the abutment $f$ of the recess F. In Figs. 4 and 5 is shown a bar L, having arms $l$, which embrace the ends of the adjacent roller H, and are provided with holes which receive gudgeons on the roller, and in Fig. 4 this bar is shown inserted to take the direct pressure of the spring and to communicate it to said roller. The bar L is also shown as having a stem J, which projects into a recess in the end wall of the recess F, and which is encircled by the coiled spring G.

A removable plate K is shown in Fig. 4 upon the member of the clutch containing the recess F, which plate more or less covers the rollers and serves to keep them in place in the recess.

As so far described, my invention will be contained in a clutch having but a single roller H. As a separate and further improvement, I propose to use a plurality of such rollers differing in diameter in the same degree as the opposite walls of the recess F converge. All the rollers will then bear on said opposite walls at the same time, and the pressure upon each will be correspondingly lessened. This provision will make the clutch more durable by diminishing the tendency of the rollers to get out of round and to indent the surfaces against which they bear.

The clutch described is adapted for use in various kinds of machinery in place of other forms of friction and other clutches. It has the advantages of starting motion of the driven member and its connections without shock or jar and of being certain and reliable or without danger of slipping or failure to carry the load when engaged. The clutch described is, moreover, without the complications in structure and consequent tendency to derangement characteristic generally of friction-clutches as heretofore made, and requires no frequent adjustment, since it will manifestly adjust itself to wear of any of its parts.

I claim as my invention—

1. The combination, in a clutch mechanism, of two independently-rotatable members, one embracing the other, and one having a tapering recess in its circular surface closed by the adjacent surface of the other member, a roller located in said recess, a spring placed behind the roller, which spring bears against a stationary support at the wide end of the recess, and which constantly exerts its force to move the roller into the narrower part of the recess, and a movable part or shifter acting in front of the roller to force it toward the wider part of the recess, substantially as described.

2. The combination of the shaft, a collar secured to the shaft, a shell embracing the collar, a roller or rollers placed in a tapering recess in one of the clutch members between converging surfaces of the collar and shell, a spring arranged between a stationary support at the wide end of the recess and the rollers to constantly push the roller or rollers toward the narrower part of the recess, and a shifter provided with a projection which enters the recess in front of the rollers to force them toward the wider end of the recess, substantially as described.

3. The combination, with a shell and a collar, one of which is provided with a tapering recess in its circular surface that is closed by the adjacent surface of the opposing member, of a roller or rollers in the recess and a movable shifter provided with a rib O, fitted to slide in an inclined groove P in the recessed member of the clutch, substantially as described, and for the purpose of moving the roller in the recess.

In testimony whereof I affix my signature in presence of two witnesses.

WILLIS H. JOHNSON.

Witnesses:
GARRE M. ELKIN,
A. D. IRWIN.